Sept. 23, 1969      G. R. LORENZEN      3,468,519
SILAGE AND FEED GRAIN MIXING AND CONVEYING SYSTEM
Filed Oct. 12, 1967      3 Sheets-Sheet 1
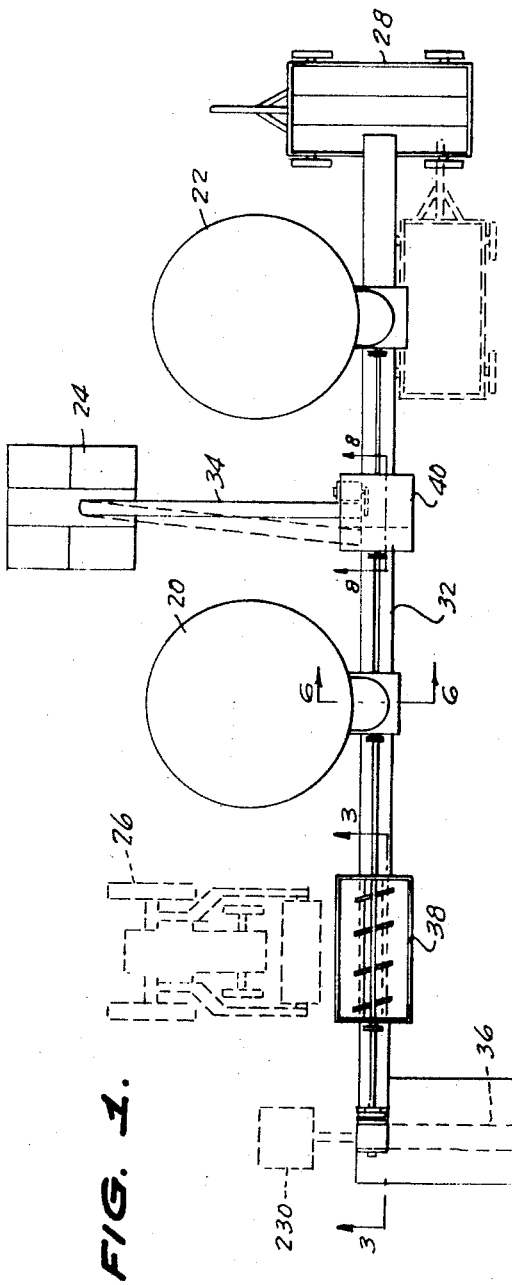
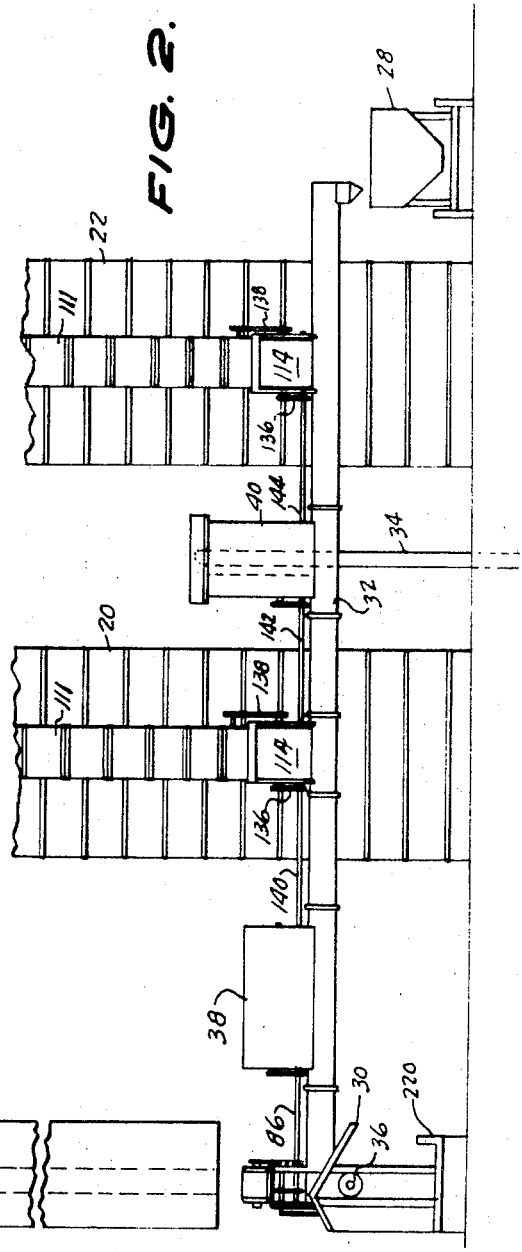
INVENTOR.
GLENN LORENZEN,
BY Kimmel, Crowell & Weaver
ATTORNEYS.

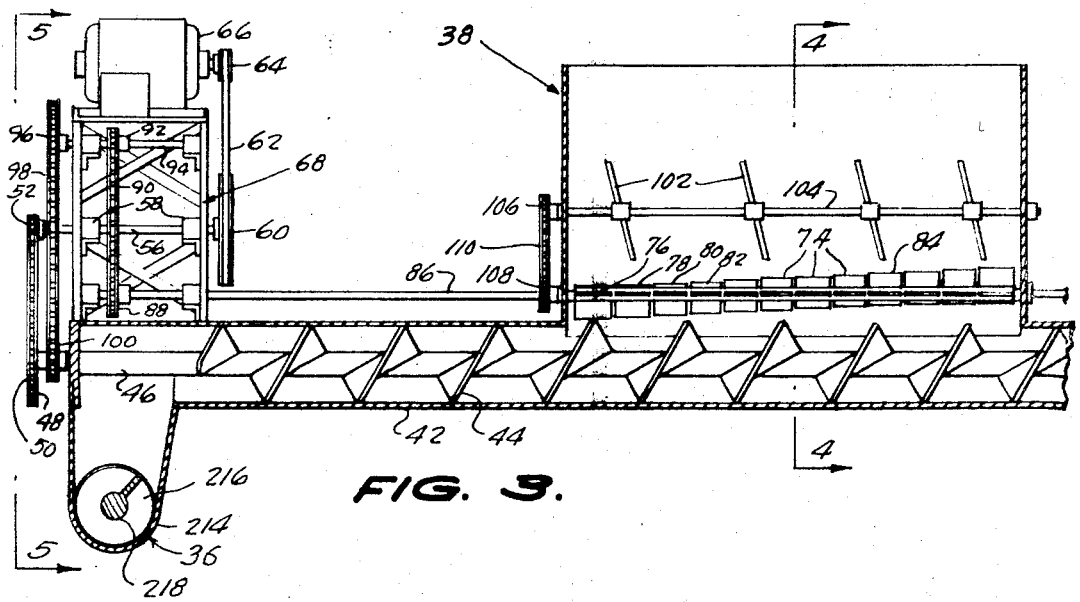
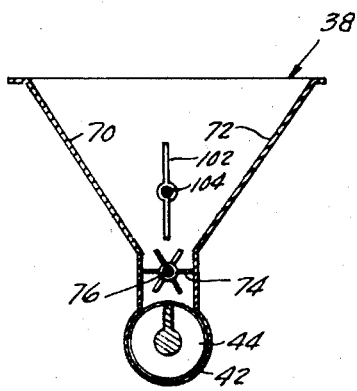
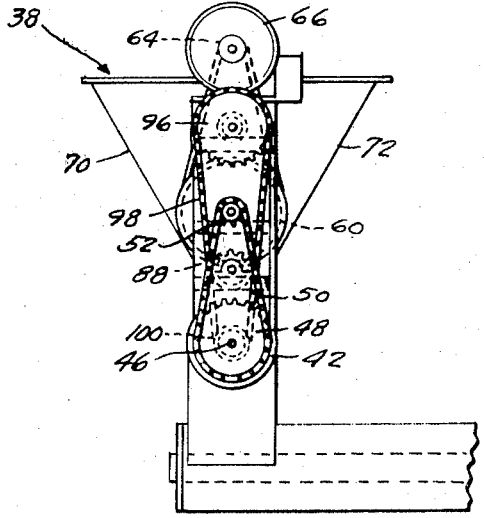

Sept. 23, 1969  G. R. LORENZEN  3,468,519
SILAGE AND FEED GRAIN MIXING AND CONVEYING SYSTEM
Filed Oct. 12, 1967  3 Sheets-Sheet 3
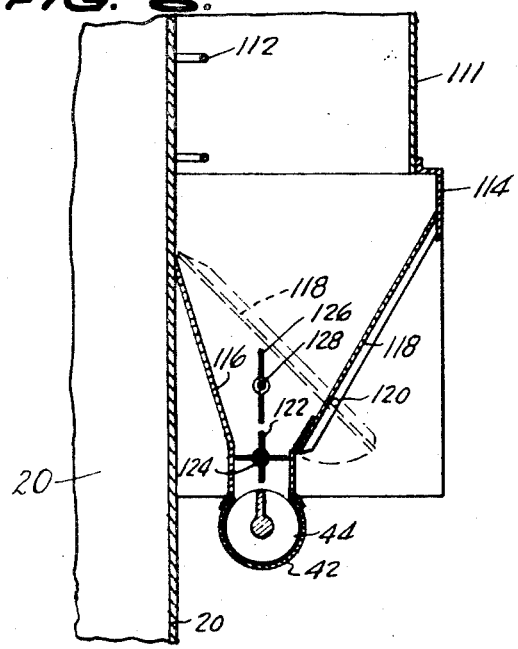
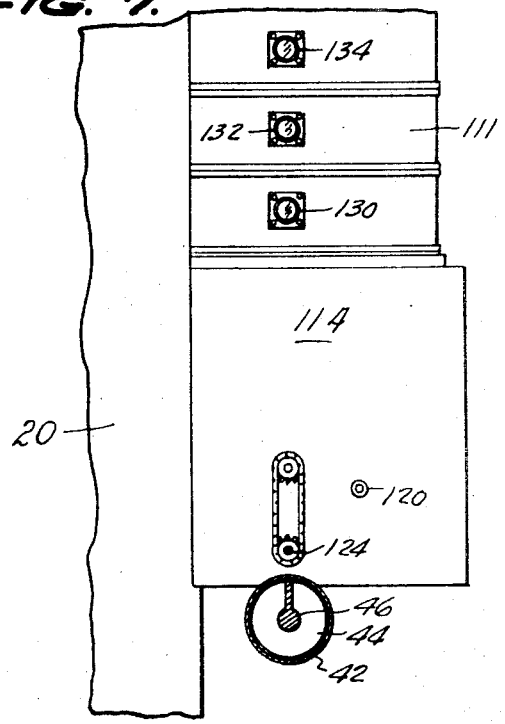
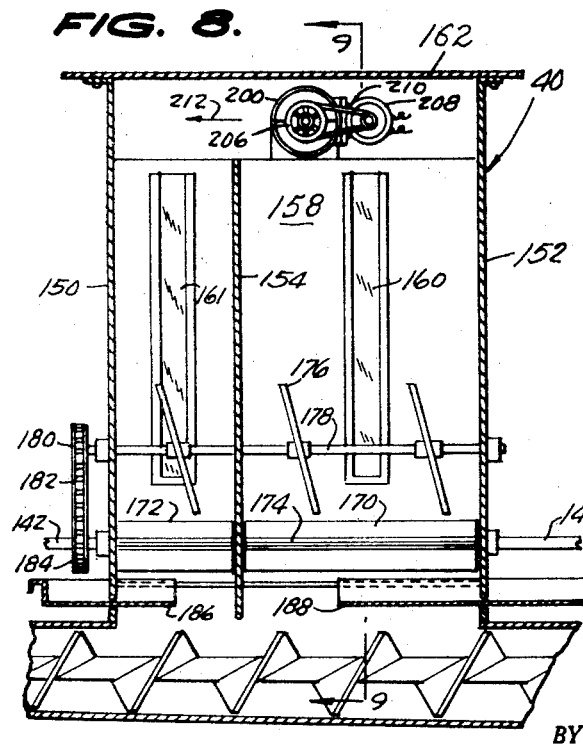
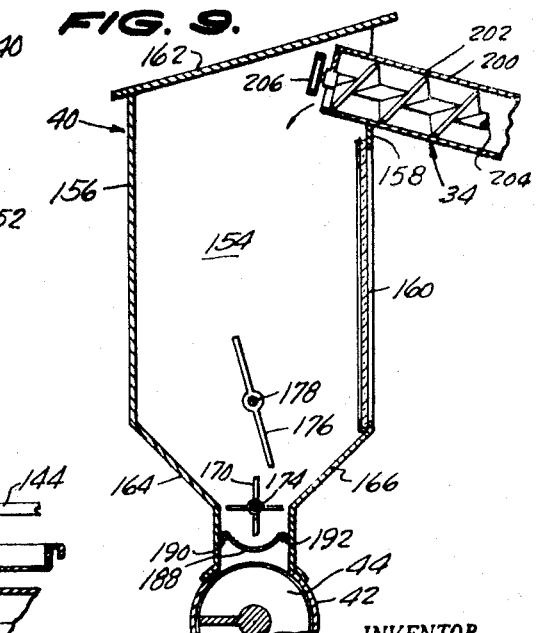
INVENTOR.
GLENN LORENZEN,
BY Kimmel, Crowell & Weaver
ATTORNEYS.

United States Patent Office 3,468,519
Patented Sept. 23, 1969

3,468,519
SILAGE AND FEED GRAIN MIXING AND
CONVEYING SYSTEM
Glenn R. Lorenzen, Arthur, Iowa 61431
Filed Oct. 12, 1967, Ser. No. 674,902
Int. Cl. B01f 7/08, 15/02; A01k 5/00
U.S. Cl. 259—9
4 Claims

ABSTRACT OF THE DISCLOSURE

A feed storage, mixing, conveying, and dispensing system comprising a pair of silos, each equipped with distributing means for alternatively mixing and metering, or directly discharging, feed therefrom; and open-top hopper for mixing and metering pit silage; a storage building feeding into a double compartment mixing and metering hopper for grain and protein feed; all said mixing and metering means being connected at spaced points to an elongated, horizontal, reversing mixer and conveyor. A second conveyor discharging into an animal feed bunk is provided at one end of the mixer conveyor so that the latter may selectively discharge thereinto, or, by reversing the direction of the conveyed material, discharge in the opposite direction into a feed wagon or the like.

BACKGROUND OF THE INVENTION

Field of the invention

This invention relates to conveying mixing and handling systems for animal feedstuffs.

Description of the prior art

Feed distributing systems are known in the prior art. For example, an apparatus for processing, storing and distributing feed for livestock is disclosed in my prior Patent No. 3,254,878, issued June 7, 1966. Feed metering devices are also known in various forms as illustrated by the Decker Patent 3,171,385, issued Mar. 2, 1965. Various conveying and metering devices are known in the prior art for handling comminuted solids of several types. The present invention comprises an improvement over the devices of the prior art in the particular mechanism for distributing the feed and in the over-all combination of the components for providing efficient and effective feed distribution. It is, accordingly, a principal object of this invention to provide an improved feeding device for mixing and distributing feed from silos, grain and protein buildings, and from pit silos to auger feed bunks or to feed distributing wagons.

SUMMARY

Without intending to limit the scope of the invention, the present improvement may be described briefly as a combination of one or more silos, one or more grain or protein buildings, one or more pit silo hopper receiving means, and metering and mixing devices for distributing a mixture of the various feeds. The central conveyer components are of the type generally denominated as Archimedes screws in which a continuous screw is received in a conduit. Rotatable metering vanes on a shaft are disposed for feeding measured quantities of feedstuff into the conveyor, the latter serving also to mix the feeds. A pair of silos are connected for feeding into the conveyer two types of animal feeds, a specially designed hopper for feeding either protein or grain feedstuffs into the conveyer and mixer are provided, and a specially designed hopper for receiving feedstuffs from a pit silo and mixing it with the other feedstuffs in the conveyer are disclosed. The feedstuffs are mixed and subsequently distributed either to auger bunks or to a feed distributing wagon, as desired.

Accordingly, it is an object of the invention to provide an improved combination feed distributing system especially adapted for supplying pit silo feedstuffs to animals.

A further object of the invention is to provide a novel feed stirring and metering system in connection with a conveyer.

The specific combination disclosed herein and the specific elements disclosed herein constitute the important objects of the invention.

Further and significant objects of the invention will become apparent from the specification which follows and from the drawings to which reference is now made.

BRIEF DESCRIPTION OF THE DRAWING

FIGURE 1 is a top plan view of the over-all combination of this invention.

FIGURE 2 is a front elevational view of the over-all combination of this invention.

FIGURE 3 is a side view in cross-section showing details of the conveyer, the conveyer drive system and the hopper for receiving feed from a pit silo.

FIGURE 4 is an end cross-sectional view showing the interior construction of the pit silo hopper.

FIGURE 5 is an end view showing details of the drive system for the conveyer, the dispensing meter, and the stirring system for the pit silo hopper.

FIGURE 6 is a side cross-sectional view, in elevation, of the means for feeding animal feedstuffs from a vertical silo to the mixer and the conveyer including metering means and loosening means for the feedstuffs.

FIGURE 7 is a side view in elevation showing the feed system of FIGURE 6.

FIGURE 8 is a front view in elevation and partial cross-section showing the interior construction of a specially designed feed bin for supplying protein and grain to the mixing and conveying system.

FIGURE 9 is a side cross-sectional view in elevation showing the interior construction of the bin of FIGURE 8.

DESCRIPTION OF THE PREFERRED EMBODIMENT

The present invention is designed for the purpose of feeding animal feedstuffs from one or two silos indicated at 20 and 22, from a grain and protein building 24 and from a pit silo by means of a tractor, loader, or similar device, shown at 26. The mixed feed from these sources may be distributed to a wagon 28 for further distribution to the animals or may be distributed directly to an animal auger bunk shown generally at 30. The distribution is by means of a main conveyer mixer combination shown at 32, a conveyer 34 for bringing the grain or protein from the grain and protein building 24 and a second auxiliary conveyer 36 for carrying the mixed feedstuffs into the bunk area 30.

A hopper 38 is provided for receiving the feed from the pit silo loader 26. A hopper 40 for receiving and dispensing the protein and grain from the protein building 24 is provided.

Referring now to FIGURE 3, primarily, the conveying and mixing system of this invention includes a conduit 42 having therein a screw 44 to provide an Archimedes screw type combination. The screw 44 is rotated by means of a shaft 46 which is secured to a pulley 48. The pulley 48 is rotated by means of a chain 50 which is driven from a pulley 52 carried by an idler shaft 56 supported by bearings 58. The idler shaft 56 is rotated by means of a pulley 60, a belt 62 and a pulley 64 which is driven by a motor 66, preferably an electric motor although an internal combustion engine would serve the purpose. The bearings 58 and the other components are generally supported by a support frame shown at 68.

FIGURES 4 and 5 show the hopper 38 for receiving the pit silo feedstuffs. This hopper 38 includes a pair of inwardly inclined walls 70 and 72 which converge downwardly to open into the top of the conduit 42. Disposed proximate the opening in the conduit is a metering system including a plurality of vanes 74 secured to a shaft 76.

As indicated in FIGURE 3, the vanes 74 may be staggered angularly on the shaft and are in sequence. Thus, a sequence of relatively staggered vanes 78, 80, 82 and 84 are so arranged that no more than one vane is dropping feed into the conveying auger 32 at one time. The shaft 76 is driven by means of shaft 86 which is, in turn, rotated by a sprocket 88, a chain 90 and a sprocket 92 which is rotated by an idler shaft 94. The idler shaft 94 is driven by means of a sprocket 96, a chain 98 and a sprocket 100 from the shaft 46. Thus, rotation of the shaft 46 automatically causes the metering vanes to rotate. The relative speed of rotation is, of course, controlled by the relative sizes of the sprockets.

Also provided in the hopper 38 for receiving pit silo feedstuffs are a plurality of mixing rods 102 which are secured to a shaft 104. Shaft 104 is rotated by means of a sprocket 106, a chain 110 and a sprocket 108 from the shaft 86. It will be apparent, then, that rotation of shaft 46 by the motor 66 would cause the metering vanes 74 to rotate and the stirring rods or members 102 to rotate as well.

This combination has been found highly desirable, if not necessary, for efficient operation. As is known in the art, it has become common practice for farmers to cut their corn or other grain, such as maize and like crops, into ensilage and to store the ensilage in pit silos. A pit silo is simply a hole in the ground which is commonly lined with a moisture impervious plastic liner. The silage is dumped in the hole and covered. Over the intervening weeks or months the silage cures and it is available for feeding simply by removing it from the pit silo by means of a loader such as indicated generally at 26. Since the ensilage consists of ground-up stocks of corn or maize and the like, it is rather coarse. In addition, since it has been lying in the pit silo for some period of time, it tends to mat together making metered dispensing difficult or impossible. Therefore, in order to provide for consistent and uniform dispensing of the ensilage from a pit silo, it is necessary to break up the clumps of ensilage to provide for efficient metering of uniform quantities. To this end, the rods 102 are rotated in the bin wherein they break up the clumps of ensilage and break the ensilage into a fine free flowing product which is then metered very uniformly by means of the vanes 74 into the conveying and mixing system 42.

Referring to FIGURES 6 and 7, a similar problem exists with respect to the feedstuffs normally stored in a vertical silo. In order to provide a balanced diet for the animals, several feedstuffs must be mixed. For example, ground ensilage may be stored in a pit silo for curing. Ground maize ensilage may be stored in a vertical silo, and ground alfalfa or other feedstuffs may be stored in yet an additional vertical silo. All of these feedstuffs tend to mat and form large unwieldly clumps upon storage. As illustrated in FIGURES 2 and 6, it is preferable that the silos 20, 22 be provided with downward conduits or chutes 111 on the outside and may include therein a ladder 112 for access. The chute 111 receives the clumps of feedstuffs from inside the silos 20, 22 and collects them for dispensing into the conveyer system 32. The chute or conduit 111 terminates in a distributing box 114. The distributing box 114 is generally rectangular and is provided with an interior wall 116 which, in combination with a pivotal wall 118 forms a downwardly and inwardly converging passageway directed to the conveyer system including conduit 42 and screw 44. In this position, the feedstuffs are metered by means of vanes 122, mounted on and rotated by a shaft 124 in the manner previously described with respect to the pit silo hopper. In addition, beaters 126 rotated by a shaft 128 break up the clumps of feedstuffs before they reach the metering system. The level of feedstuff inside the chute 111 may be observed through wnidows 130, 132 and 134. The shaft 124 is driven by a sprocket or belt system 136 and the beating members 126 are driven by means of shaft 128 and a belt or sprocket system shown at 138. The shaft 140 carries motion from shaft 86 to the system 136 and the shaft 142 and shaft 144 carry the rotary motion to the bin 40 and to the other silo 22 which has a similarly constructed bearing and metering system.

As will be apparent from FIGURE 6, it is possible to direct the feedstuffs from the silo either into the conveying and mixing system or to direct them into a waiting wagon underneath the chute 111 simply by pivotally moving the wall or door 118 about its pivot point 120. This provides for additional flexibility in case it is desired to feed only one type of feedstuff to the animals for a period of time.

Referring now to FIGURES 8 and 9, the hopper 40 for metering grain and protein feeds into the mixing and conveying system includes a generally rectangular box having end walls 150 and 152, front and back walls 156, 158 and an interiorly disposed dividing wall 154 with wall 158 having a pair of windows 160 and 161 therein to permit viewing of the feed level inside the hopper. A top 162 is also provided.

The bottom of the hopper 40 comprises inwardly and downwardly converging walls 164 and 166 which open into the conduit 42. Metering vanes 170 and 172 are provided, respectively, in the grain and protein dispensing portions, carried by a shaft 174. Similarly, beaters or rods 176 are carried by a shaft 178 in the respective compartments of the hopper. The shaft 178 is rotated by means of a sprocket 180, a chain 182 and a sprocket 184, the sprocket 184 being received on the shaft 142 previously described. Of course, the shaft 174 is driven by the shaft 142 and drives the shaft 144.

An important feature of the invention is the provision of a pair of upwardly concave longitudinally slidable closure members 186, 188 for controlling the amount of protein and/or grain to be added to the feed mixture. The slidable closures 186 and 188 are supported by rods or brackets 190 and 192, best shown in FIGURE 9. These slidable closures 186, 188 are received below the metering device and it is possible to close or to open either of them independently and to adjust them at any intermediate position.

Grain or protein, selectively, is conveyed from the grain and protein house 24 by means of the conveyer 34 which includes a conduit 200 and an Archimedes type screw 202 therein. The screw is driven by a shaft 204 and a pulley 206, the latter being driven by means of a motor 208 and a belt 210. As indicated by the arrow at 212, the end of the conveyer 34 may be moved horizontally so that it is disposed either above the larger grain receiving compartment or above the smaller protein receiving compartment, as desired.

OPERATION

It will be apparent that the system as described has maximum flexibility insofar as selection and distribution of the feedstuffs are concerned. In order, however, to fully point out the capabilities of the system, the most complex feed system will be described. It will be understood that one or more of the feed sources may be omitted without affecting the other sources of feedstuff and the dispensing and mixing systems therefor.

Assume, then, that it is desired to feed, for example, corn ensilage from a pit silo, maize ensilage from a vertical silo 20, ground alfalfa from a vertical silo 22, grain and a protein concentrate from the building 24. The first step is to fill the hopper 40 with a sufficient quantity of grain and then to fill it with a sufficient quantity of protein. This is done by energizing the motor 208 and driving the conveyer system 34.

Assume, first, that it is desired to dispense the mixed feed into the wagon 28. The proper direction of rotation of the screw 44 is selected and the motor 66 is energized. Preferably, motor 66 is of the type which is reversible in direction merely by reversing the polarity of the fields, as is known in the electrical art.

The hopper 38 is then filled with corn and silage from the pit silo by means of the loader 26. A measured quantity of the corn ensilage is carried by the conveyer system 32 to a point where maize ensilage is dropped into the conveying and mixing system from the vertical silo 20. As this mixture of feedstuffs is carried under the grain and protein hopper 40, measured quantities of both grain and protein concentrate are dropped into the conveying line and are mixed with the feedstuff. Further down the conveying system 32, ground alfalfa hay is added. All these feedstuffs are mixed together in the conveyer and are dispensed into the wagon 28. The wagon 28 is then moved to the proper location and the grain is conveyed or thrown into proper feed bins for the animals. A uniform mixture of feed is provided throughout the wagon, thereby providing maximum efficiency and distribution and minimum wastage of feedstuffs.

Assume, now, that it is desired to feed the mixture directly to animals feeding at a feed bunk 30. The direction of rotation of the conveyer is then reversed and the reverse process obtains. That is, hay is fed from the silo 22, grain and protein from the bin 40, maize ensilage from the silo 20 and corn ensilage from the hopper 38. As best ilustrated in FIGURE 3, as the feedstuffs are mixed and conveyed to the left, as there illustrated, the feedstuffs fall into the conveyer 36 which includes a conduit portion 214 with an Archimedes type screw 216 rotated by shaft 218 therein. The shaft 218 may be rotated by any desired means and may, if desired, be interconnected with the motor 66. Alternatively, a special motor may be connected to the screw shaft 218 according to known practice. The conduit 36 may have openings along the length thereof to permit the grain to be dropped out into the bottom 220 of the bunk 30 as shown in FIGURE 2.

It will be apparent from the foregoing that a system having maximum flexibility and utility has been described. It will be understood that the feedstuffs described are merely exemplary of the type of feedstuffs which may be used and that other feedstuffs of any desired type may be substituted therefor. It will be understood also that it is not necessary to feed all of the feedstuffs in mixture but to feed only those which are desired for the particular purpose. Thus, for one feeding, the animals could be fed primarily grain and protein diet, for another feeding they could be fed primarily a hay diet, and yet for another feeding they could be fed primarily an ensilage diet, or, as in the example described, they could be fed a mixture of all at the same time. It is important to note that this degree of selection and uniform metering of feed is obtained with only minor preliminary adjustment of the control systems and that no further attention is required. This is an important factor for large feeding operations since a major cost component of the operation is the paying of labor for handling the feedstuffs. By the installation of this system one man can do the work of several. According to timing and control mechanisms known in the prior art, it will be understood that each hopper comprising the system can be prefilled with a predetermined amount of feedstuff to provide a specific quantity and kind of feedstuff mixture and through the use of such time, clock and control mechanisms the system may be automated to such an extent as to provide a specific quantity and kind of mixture and a time for feeding of the feedstuff to the animals. Such a timing mechanism is shown generally in schematic form in FIGURE 1 at 230. Of course, once the silos and hoppers are filled with the proper feedstuffs, all that is necessary is that the motor 66 be turned on and off, in the proper direction, at the proper times.

It will be understood that while the invention has been described with respect to specific constructions and mechanisms that equivalent constructions and mechanisms may be used without departing from the spirit of the invention.

I claim:

1. An animal feed storage, mixing, conveying and dispensing system comprising:

a pair of upright silos supported on the ground and arranged adjacent to each other, a horizontal mixer conveyor arranged closely adjacent each of said upright silos and extending at each end beyond said silos, a distributing box mounted on the side of each of said silos and connected to said mixer conveyor and adapted to feed ensilage into said mixer conveyor, means on each of said silos for feeding ensilage from said silo to its respective distributor box, an open top hopper adapted to receive ensilage from a loader, said hopper being mounted on said mixer conveyor and adapted to feed ensilage into said mixer conveyor, a building adjacent said silos for storing grain and protein feed, a double compartment hopper mounted on said mixer conveyor and adapted to feed grain and protein feed into said mixer conveyor, an auxiliary conveyor for conveying grain and protein feed from said building to said double compartment hopper, said auxiliary conveyor being swingable to selectively discharge into either compartment of said double compartment hopper, an elongated ground supported animal feed bunk positioned adjacent one end of said mixer conveyor, a conveyor extending through said bunk and adapted to discharge at longitudinally spaced points in said bunk, said conveyor having one end underlying said mixer conveyor to receive animal feed discharged therefrom, a rotary feed mixer and metering system in each of said hoppers and said distributor boxes, power means for selectively driving said mixer conveyor in either direction of rotation, and means driving said feed mixer and metering systems from said mixer conveyor.

2. A device as claimed in claim 1 wherein said feed mixer and metering system each comprises:

a rotary beater in the hopper which includes a plurality of rods mounted on a shaft for mixing and breaking clumps in feedstuffs;

a shaft mounted for rotation in said hopper and a plurality of spaced vanes secured thereto, said vanes disposed to form chambers of a predetermined volume in cooperation with the walls of the hopper; and means for rotating the beater and said shaft to which said vanes are secured.

3. A device as claimed in claim 2 wherein said double compartment hopper includes:

a movable door at the bottom of each compartment constructed and disposed for controlling the passage of feed from the compartment to the mixer conveyor.

4. A device as claimed in claim 3 wherein each of said distributor boxes includes:

a pivotal portion forming a wall of the box for selectively being pivoted from a first position where the feed is directed to the mixer conveyor to a second position for directing the feed to an external receptacle such as a wagon.

References Cited

UNITED STATES PATENTS

| | | | |
|---|---|---|---|
| 455,246 | 6/1891 | Clifford | 259—25 |
| 1,413,345 | 4/1922 | Morris | 259—6 |
| 1,544,765 | 7/1925 | Lawrence. | |
| 2,025,077 | 12/1935 | Stewart | 259—25 |
| 2,305,423 | 12/1942 | Heuser. | |
| 3,131,911 | 5/1964 | Geerlings | 259—25 XR |
| 3,182,968 | 5/1965 | Geerlings | 259—9 |
| 3,254,878 | 6/1966 | Lorenzen | 259—97 XR |

WALTER A. SCHEEL, Primary Examiner

JOHN M. BELL, Assistant Examiner

U.S. Cl. X.R.

99—235; 119—51, 52; 214—16; 259—6, 26